J. S. WIGNALL, Jr., AND O. E. McCLELLAN.
HYDRAULIC CLUTCH.
APPLICATION FILED JULY 14, 1919.
1,418,761.
Patented June 6, 1922.
2 SHEETS—SHEET 1.
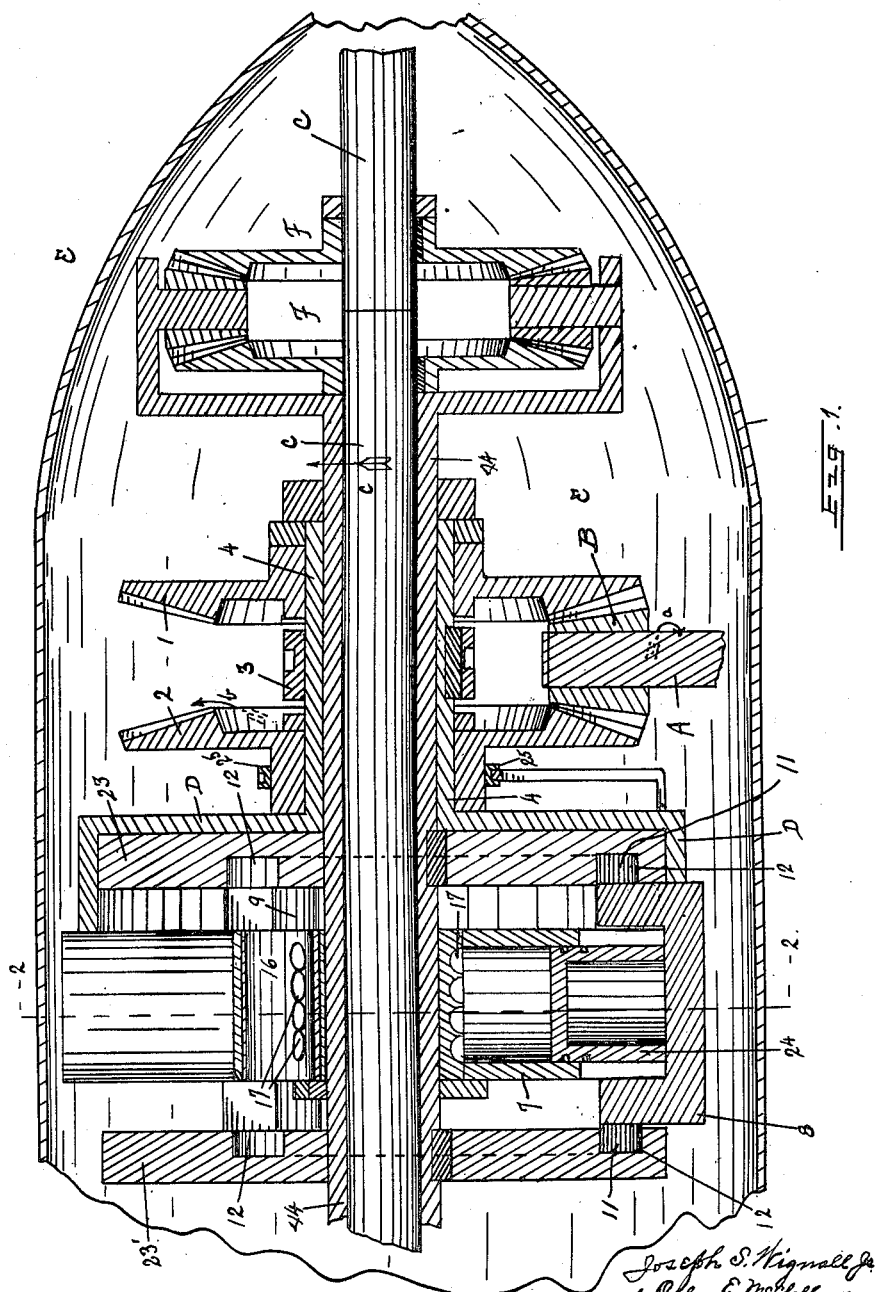
Joseph S. Wignall Jr.
and Olla E. McClellan
INVENTORS.
BY J. M. Thomas
ATTORNEY

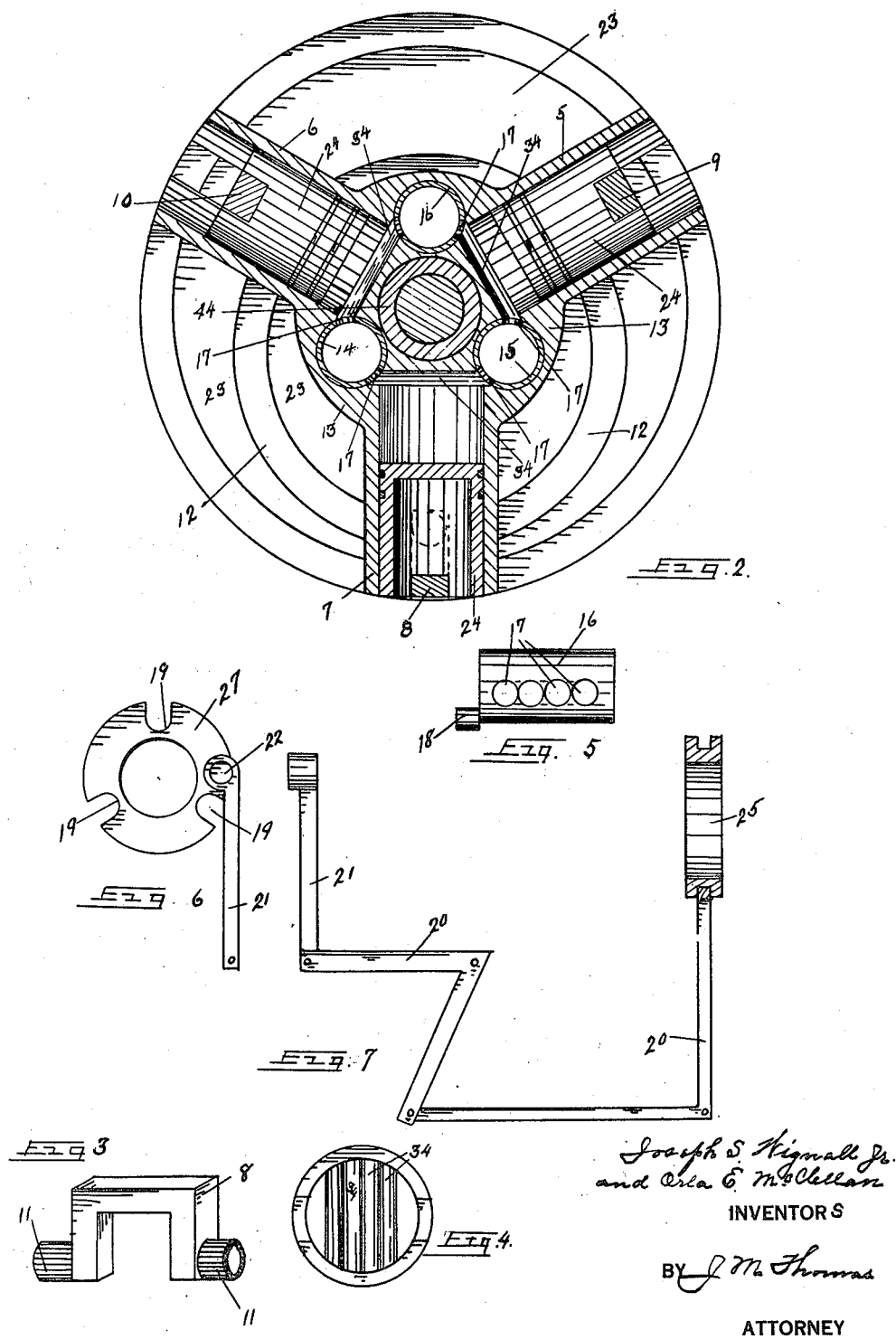

UNITED STATES PATENT OFFICE.

JOSEPH S. WIGNALL, JR., AND ORLA E. McCLELLAN, OF PAYSON, UTAH.

HYDRAULIC CLUTCH.

1,418,761.    Specification of Letters Patent.    Patented June 6, 1922.

Application filed July 14, 1919. Serial No. 310,658.

*To all whom it may concern:*

Be it known that we, JOSEPH S. WIGNALL, Jr., and ORLA E. McCLELLAN, citizens of the United States, residing at Payson, in the county of Utah and State of Utah, have invented certain new and useful Improvements in Hydraulic Clutches, of which the following is a specification.

Our invention relates to hydraulic clutches, and has for its object to provide an oil clutch by which power may be transmitted from a driving shaft to a driven shaft or axle positioned at right angles to the driving shaft without the use of transmission gears and levers.

These objects we accomplish with the machine illustrated in the accompanying drawings in which similar letters and numerals of reference indicate like parts throughout the several figures and as described in the specification forming a part of this application and pointed out in the appended claim.

In the drawings in which we have shown a substantial embodiment of our invention, Figure 1 is a longitudinal section of the casing and the driven shaft with the manually operated clutch whereby power from the driving shaft may be imparted to the driven shaft to rotate said driven shaft in either direction as desired. Figure 2 is a section on line 2—2 of Figure 1. Figure 3 is a side elevation of one of the U-shaped connecting rods by which the pistons are held within their respective casings with the roller bearings thereon, parts cut away. Figure 4 is an end elevation of one of the piston casings. Figure 5 is a side elevation of one of the valves. Figure 6 is a plan view of the valve moving washer and showing the operating pin, and connecting link. Figure 7 is a side elevation of the same link and the operating levers connected therewith and collar shown in section by which said levers are moved. The present invention consists of the driving shaft A on the end of which is carried the driving pinion B the teeth of which mesh with the teeth of two bevel gears 1 and 2, which in turn are carried on a flange bearing 4 and it is carried directly on a sleeve bearing 44 which is journalled on the driven shaft C. A slidable clutch 3 is splined on a flange bearing 4 which is also carried on said sleeve bearing and said clutch may be positioned between said bevel gears so that it may not be in mesh with either or it may be moved longitudinally on said flange bearing 4 to engage either of said gears 1 and 2 as desired. Integral with said flange bearing 4 is the casing D of the device. Within said casing D is secured the hub 13 within which is bored three radially disposed piston chambers 5, 6 and 7, with the respective pistons 24 operable therein. There are three of said pistons and they are fastened to their respective connecting rods. The walls of each of said chambers are slotted to allow U-shaped connecting rods, 8, 9 and 10 to move said pistons longitudinally within their respective chambers. Roller bearings 11 are carried on the end portions of said connecting rods and are to be operated with the end portions of said connecting rods within two opposed eccentric cam tracks or channels 12 which are formed in the side faces of two opposed disks 23 and 23' which are secured to the bearing sleeve 44 within said casing D. The cylindrically shaped valves 14, 15 and 16, each having a plurality of ports 17 in its wall, are carried transversely in said chambers 5, 6, and 7 respectively, and may be partially rotated by the annular washer 27, which is also carried on said sleeve bearing 44. Transverse conduits 34 are provided connecting the interior of said piston chambers 5, 6 and 7 with each other and of the same size and number as the said ports 17 and said conduits 34 are open on one side to the interior of said chambers 5, 6, and 7. In order to effect the partial rotation of said valves a lug 18 is longitudinally extended from the edge of each of said valves 14, 15 and 16, which lugs engage within slots 19 that are cut into the periphery of said annular washer. A manually operated chain of bell crank levers 20 having one end of one of the arms, or a link 21, pivoted on a pin 22 which is secured on the face of said annular washer 27, is the means provided for partially rotating said valves to open and close said ports 17 in the valves 14, 15 and 16, and to the extent that said ports are opened or closed will the speed imparted to said shaft C be low or high as desired.

The said casing D through said flange bearing 4 is operatively connected with said driving shaft A through the said bevel gears and bevel pinion B, and when said casing D is rotated, it carries the U-shaped connecting rods with it. As the end portions of each of said connecting rods engage in the cam tracks 12, the pistons 24 are reciprocated in their respective chambers. If the ports of said chambers are open, no resistance will be offered to the movements of these elements except the minor one of friction of the parts; but if the said chamber ports are closed or partially closed by rotating the valves 14, 15 and 16 resistance will be offered which will cause the connecting rods 8, 9 and 10 to engage with the sides of the cam tracks 12 and motion will be imparted to the disk plates 23 and 23', and as said disk plates are keyed on the sleeve bearing 44, which in turn is operatively connected with said shaft C, the said shaft will be rotated. The said sleeve bearing is connected with said shaft C through the flange on said sleeve bearing and the differential gears and case, shown at F F. The cam disks 23 and 23' are keyed on the said sleeve bearing 44 instead of being keyed directly on the driven shaft.

Two ways are provided in which no power will be transmitted even when the engine is in motion, the first is when the clutch 3 is in neutral position, as in that case no connection is made between the driving shaft A and its pinion B and any driven element. In the second, even though said clutch 3 engages one of the gears 1 or 2, and thereby the sleeve bearing 44, disks 23 and 23' and all parts of the machine except shaft C are in operation yet if the ports 17 are open there will be no clutching with shaft C, as the flow of oil will be free and the load influence will overcome all friction of said moving parts, and they will not be moved. To move the load forward or backward at slow speed, the operator must offer resistance to such flow of oil, which is done by partially closing said ports 17.

The operation of our device is as follows:—

With oil supplied to fill the oil casing E to about two-thirds its capacity and power applied to the driving shaft A, motion will be imparted to the driven shaft C through the driving pinion B, as the clutch 3 is thrown into engagement with either of said gear wheels. As indicated by the arrows in Figure 1, if the driving shaft A is rotated in the direction of arrow $a$ the gear wheels 1 and 2 will be rotated in opposite directions and with said clutch 3 not engaged with either gear as shown in said Figure 1 no power will be transmitted to said shaft C. Now if the said clutch is thrown into engagement with gear wheel 2 said wheel will be rotated as indicated by arrow $b$, and the flange bearing 4, casing D and the parts therein, together with the sleeve bearing 44 will be rotated therewith and in the same direction, with such speed as regulated by the position of ports 17 in the valves 14, 15 and 16 with reference to the conduits 34. If said ports are closed the eccentric travel of the roller bearing end portions of said U-shaped connecting rods cannot take place as said pistons 24 will not operate in their respective chambers and the full power and speed of said driving shaft will be imparted to said shaft C. Now if the collar 25 is moved, the levers 20 and the link rod 21 will partially rotate the annular washer 27. The lugs 18 being within said slots 19 will be moved partially around the axis of said valves and the said valves will be moved to open or partially open said ports 17 to the conduits 34 in order that there will be no vacuum in said chambers 5, 6 and 7. The freedom with which said pistons 24 may move in their respective chambers determines the speed imparted to said shaft C and correspondingly the power transmitted. When the said clutch 3 is thrown into engagement with the gear wheel 1 the flange bearing 4, sleeve bearing 44, casing D and the parts therein will be rotated in the opposite direction as shown by arrow $c$, provided the said valve ports 17 are open and in partial or full alinement with the conduits 34. One portion of said sleeve bearing 44 carries the commonly used differential gears as shown at F. Levers to move said clutch 3 and collar 25 are not shown but the usual grooves are cut in said members within which the lever may engage to move them.

We thus provide in the present invention a new connection between the driving and the driven shaft, also a novel means of preventing the movement of the pistons, and new and novel valves and ports to control the flow of the oil; and having thus described our invention and its operation we desire to secure by Letters Patent and claim:—

In a machine of the class described the combination with a driving shaft and pinion gear thereon, of bevel gears whose teeth are engaged by the teeth of said pinion; a casing having a flanged portion thereon on which said bevel gears are journalled; a clutch splined on said flange portion; radially disposed piston chambers within said casing having slots in their walls; pistons operable in said chambers; U-shaped connecting rods fastened to said pistons and whose medial portions are operable in the slots in said chambers and whose end portions are extended as bearings; ports in the end walls of said chambers; cylindrical valves having ports therein adapted to be brought into alinement with the ports in said chambers; a driven shaft; a sleeve bearing with which said driven shaft is connected and on which the flanged portion of said casing is journalled; spaced apart disks keyed on said sleeve bearing and having opposed bearing tracks therein within which the bearing portions of said U-shaped connecting rods operate to impart motion from said driving to said driven shaft.

In testimony whereof we have affixed our signatures.

JOSEPH S. WIGNALL, Jr.
ORLA E. McCLELLAN.

Witnesses:
A. R. WILSON,
DEON COLVIN.